United States Patent Office

3,101,270
Patented Aug. 20, 1963

3,101,270
PHOTOPOLYMERIZATION OF UNSATURATED ORGANIC COMPOUNDS BY MEANS OF RADIATION SENSITIVE IRON COMPOUNDS AS PHOTOINITIATORS
Helene D. Evans, Endwell, and Fritz W. H. Mueller, Binghamton, N.Y., assignors to General Aniline & Film Corporation, New York, N.Y., a corporation of Delaware
No Drawing. Filed Apr. 27, 1959, Ser. No. 808,882
17 Claims. (Cl. 96—115)

The present invention relates to the catalytic photopolymerization of polymerizable unsaturated organic compounds in the presence of peroxides while employing as the photoinitiator for such photopolymerization a radiation sensitive ferric compound or an irradiated ferric compound to polymers obtained therefrom and to photographic elements based thereon.

It is, of course, well known in the art to effect the polymerization of various unsaturated organic compounds such as vinyl compounds or vinyl monomers. This reaction, commonly referred to as addition polymerization, has been extensively investigated and the literature abounds with numerous procedures for the preparation of polymeric substances characterized by a wide range of chemical and physical properties.

Generally, the addition polymerization of monomeric vinyl compounds is brought about by the action of a peroxide catalyst at elevated temperatures, the function of the peroxide catalyst serving to supply the free radical for initiating the polymerization. Such a reaction can be carried out using a solution of the monomer or it may be desirable to employ the monomer in the form of a dispersion. By using mixtures of various vinyl compounds, it is possible to obtain a mixed polymer or copolymer having properties which differ from those of a homo polymer.

It is also recognized that the polymerization of certain monomeric vinyl compounds, particularly the more reactive specie, can be initiated by exposure to high intensity radiation such as ultraviolet rays of the type emanating from sunlight or a carbon arc. Thus, it is kown that methyl acrylate, on long standing in the sunlight, is transformed into a transparent odorless mass of density 1.22 and in this connection reference is made to Ellis, "The Chemistry of Synthetic Resins" (volume II), (1935), page 1072. It is to be noted, however, that the polymerization by the use of light alone proceeds at a very much slower rate when compared to polymerization brought about by a peroxide catalyst and heat. Then too, the use of light, unaided by other agents, tends to result in a low molecular weight polymer.

Once it was discovered that certain unsaturated organic compounds could be induced to undergo polymerization although at a slow rate by the action of radiation, much work and effort was devoted to improving the efficiency of such a system. It was early realized that, while extremely useful for bulk polymerization, the application of radiant energy to effect polymerization was particularly intriguing in the field of imagewise polymerization and many photographic reproduction systems were possible. The general procedure comprised coating a suitable base or support with a monomer or mixture of monomers followed by exposure to a high intensity light source through a pattern. In the exposed areas, the monomer was polymerized to a more or less hard and insoluble mass, whereas the unexposed areas which consisted of the original monomer could easily be removed by washing. There was thus left, in the exposed areas, a raised resist of insoluble polymer or copolymer. However, such systems, while theoretically workable, were difficult to achieve in practice. In the first place, inordinately long exposure times were required in order to sufficiently toughen or polymerize the monomer in the exposed areas to prevent its being washed away with the monomer in the unexposed areas. Furthermore, the low speed of these systems necessitated the use of extremely high intensity radiation sources such as high intensity carbon arcs or bright sunlight.

In an effort to speed up the sensitivity of the system, a wide variety of polymerizable compounds were investigated. Thus, Minsk et al., in U.S.P. 2,610,120 describe the use of light sensitive polymeric cinnamic acid esters such as polyvinyl cinnamate sensitized with various nitro compounds. According to the one example of this patent, a coating incorporating such light sensitive polyvinyl cinnamates required an exposure under a line or half-tone image of 1 minute placed at a distance of 4 feet from a 35 ampere white flame carbon arc.

Gerhart in U.S.P. 2,673,151 discloses a light sensitive copolymerizable mixture of (1) polyesters of alpha-beta ethylenic, alpha-beta dicarboxylic acids and (2) ethylenically unsaturated compounds copolymerized therewith, such a composition being sensitized by the addition of sulfur compounds. In this patent, it is suggested that such a composition be exposed by contact or by projection to the desired image, preferably under prolonged exposure until the action of the light has resulted in partial polymerization, i.e., a gel stage, is reached. If desired, the light source may then be removed and the mixture heated until final cure is attained. The light source used was of the high intensity type such as sunlight or light from a carbon arc, i.e., a source rich in ultraviolet radiation.

In a more recent patent, U.S.P. 2,831,768, are described light sensitive polyvinyl arylphenones having increased photographic speed. According to Example 1 of the patent, which is the only example therein containing photographic data, a coating using a light sensitive arylphenone required an exposure of 2 minutes at a distance of 10 inches from a sun lamp in order to effect image-wise polymerization.

It should also be noted that the high intensity radiant energy sources employed in the photopolymerization systems described above also produce a large quantity of infrared and heat rays. As a consequence, a certain portion of the monomer or monomers may be polymerized by the action of heat which may interfere with the production of a clean relief image. Thus, if a black and white silver halide negative pattern is used, there should be no polymerized areas under the dark portions of the pattern. However, such dark portions may possibly absorb some radiant heat with sufficient local rise in temperature to effect heat polymerization of the monomer in the light unexposed areas. As a consequence, in those systems where a light source which also has appreciable radiant heat output is used to initiate polymerization of the light sensitive layer under a black and white pattern, clean cut modulation of the polymerization would not be effected.

It is thus believed to be manifest that a need exists in the photographic and kindred arts for a photopolymer system having increased speed of response to the exposing radiation.

Accordingly, an important object of this invention is to provide a method of producing polymers by the rapid photo-polymerization of unsaturated organic compounds.

Another object of the invention is to provide a method of producing polymers by the rapid photopolymerization, while using relatively low intensity radiation, of ethylenically unsaturated organic compounds wherein a radiation sensitive iron compound is employed as radiation sensitive catalyst for said photopolymerization.

Another object of the invention is to provide sensitized compositions capable of rapid polymerization on exposure to radiation.

A further object is to provide superior light sensitive material for use in making printing plates, stencils, transfer materials, printed circuits, etc.

Other objects will become apparent as the description proceeds.

It has now been discovered that the photopolymerization of polymerizable unsaturated organic compounds can be accomplished in essentially short periods of time by means of radiation sensitive ferric compounds in the presence of a source of free radicals, preferably peroxides.

Preferred types of the radiation sensitive catalysts for practicing the invention are light sensitive ferric salts of the type commonly used in the Blueprint Process. Examples of light sensitive ferric salts which we have found satisfactory include ferric acetate, ferric and ammonium acetate, ferric ammonium citrate (brown), ferric ammonium citrate (green), ferric ammonium oxalate, ferric ammonium sulfate, ferric ammonium tartrate, ferric halides such as ferric bromide or ferric chloride, ferric citrate, ferric formate, ferric glycerol phosphate, ferric hydroxide, ferric nitrate, ferric phosphate, ferric potassium citrate, ferric potassium tartrate, ferric pyrophosphate, ferric sodium oxalate, ferric subsulfate, ferric sulfate, ferric succinate and the like.

As a source of free radicals, we prefer the per compounds because of their ready availability and low cost. Typical per compounds useful for practicing the invention include hydroperoxides such as hydrogen peroxide, aliphatic hydroperoxides, i.e., methyl hydroperoxide, ethyl hydroperoxide, t-butyl-hydroperoxide, hexyl hydroperoxide, octyl hydroperoxide, trans-decalin hydroperoxide, 1-methylcyclopentyl hydroperoxide, 1,1-dimethyl-2-propenyl hydroperoxide, 2-cyclohexene-1-yl hydroperoxide, cumene hydroperoxide, tetralin hydroperoxide, triphenyl methyl hydroperoxide, etc.; peroxides of the formula ROOR' wherein R and R', which may or may not be alike, can be alkyl such as methyl, ethyl, propyl, butyl, phenyl, hexyl, heptyl, octyl, nonyl, decyl, undecyl, etc.; aralkyl, i.e., benzyl, phenethyl, phenylpropyl, naphthylmethyl, naphthylethyl, naphthylpropyl, etc.; aryl such as phenyl, naphthyl, etc.; aliphatic acyl such as acetyl, propionyl, butyryl, valeryl, etc.; aromatic acyl such as benzoyl, naphthoyl, etc.; peroxy acids, i.e., aliphatic peroxy acids, e.g., peracetic acid, perpropionic acid, perbutyric acid, etc.; aromatic peroxy acids, i.e., perbenzoic acid, perphthalic acid, etc.; esters of the aforesaid peroxy acids; salts of peracids such as ammonium persulfate, etc. Such per compounds are well known and their description and preparation can be found in the chemical literature. In this connection, reference is made to such well known works as Organic Peroxides by Arthur V. Tobolsky and Robert B. Mesrobian and published by Interscience Publishers, Inc., New York and Interscience Publishers Ltd., London (1954).

Any normally liquid to solid photopolymerizable unsaturated organic compound is applicable in the practice of our invention. Preferably, such compounds should be ethylenically unsaturated, i.e., contain at least one non-aromatic double bond between adjacent carbon atoms. Compounds particularly advantageous are the photopolymerizable vinyl or vinylidene compounds containing a $CH_2=C<$ group activated by direct attachment to a negative group such as halogen, $>C=O$, $-C\equiv N$, $-C\equiv C$, $-O-$, or aryl. Examples of such photopolymerizable unsaturated organic compounds include acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylanitrile and the like.

The above ethylenically unsaturated organic compounds, or monomers as they are sometimes called, may be used either alone or in admixture in order to vary the physical properties such as molecular weight, hardness, etc. of the final polymer. Thus, it is a recognized practice, in order to produce a vinyl polymer of the desired physical properties, to polymerize in the presence of a small amount of an unsaturated compound containing at least two terminal vinyl groups each linked to a carbon atom in a straight chain or in a ring. The function of such compounds is to cross-link the polyvinyl chains. This technique, as used in polymerization, is further described by Kropa and Bradley in vol. 31, No. 12, of "Industrial and Engineering Chemistry," 1939. Among such cross-linking agents for the purpose described herein may be mentioned N,N'-methylene-bis-acrylamide, triallyl cyanurate, divinyl benzene, divinyl ketones and diglycol diacrylate. Generally speaking, increasing the quantity of cross-linking agents increases the hardness of the polymer obtained in the range wherein the ratio of monomer to cross-linking agent varies from 10:1 to 50:1.

The quantity of ferric salts used to initiate polymerization of the monomer or unsaturated organic compound is not critical and may be varied over wide limits. In general, we have found that satisfactory results ensue if the proportion of ferric ion to monomer varies from 1:10,000 to 1:6.

The photopolymerization can be carried out under a wide variety of conditions employing numerous modifications. Our system of photopolymerization is particularly valuable in the field of photography where its high speed and response to relatively low intensity radiation sources make it ideal for imagewise polymerization. One valuable application of our process, for example, is the production of relief printing plates for use in the graphic arts. Such plates can be fabricated by coating a mixture of monomer or monomers in a suitable solvent plus a small quantity of ferric salt on a suitable base or support. The resulting coating can then be exposed to a radiation source such as an incandescent bulb having a tungsten filament after which it is treated with a per compound. The exposed areas undergo rapid polymerization in the presence of per compound and irradiated ferric salts whereas the unexposed areas are left unaffected so that the unreacted or unpolymerized monomers may be washed off or otherwise removed. A resist is thus formed of the photopolymerized polymer which can be used as a negative working relief plate. By employing a hydrophilic surface as the support for the coating such as a partially saponified cellulose acetate, a plate is produced having greasy, ink-receptive and water-receptive areas. Such a plate can then be used as a negative working offset plate for the production of printed copies.

In the field of photography, our invention can be used for example for the production of black and white prints. Thus, a light sensitive plate is prepared having coated thereon a layer comprising an unsaturated organic compound, a light sensitive ferric compound and a finely divided black pigment. This plate is then exposed beneath a silver negative which causes polymerization in the exposed areas of the coating. After washing with water to remove unpolymerized monomer in the unexposed regions, there is obtained a reversed polymeric photographic image.

In some instances, it may be desirable to employ a hydrophilic colloid as the carrier for the light sensitive ferric compound. Suitable colloid carriers for this purpose include polyvinyl alcohol, casein, glue, saponified cellulose acetate, carboxymethyl cellulose, starch and the like.

Another photographic application of our invention is in color reproduction. For example, a light sensitive plate is prepared as described above, i.e., containing a monomer and ferric compound, and exposed to one of the primary color aspects of a subject using a color separation negative. After treatment with a per compound to effect polymerization in the exposed areas, the so obtained polymerized image is then subtractively dyed. By exposing other light sensitive plates to the remaining primary color aspects of the subject, processing as described above to effect polymerization in the exposed areas followed by dyeing with the appropriate subtractive dye, superimposition of the resulting subtractively colored images will then reproduce the original subject.

Other uses to which the above photopolymers may be put include such photographic and lithographic applications as for example in the production of bimetallic printing plates, etched copper half-tone images, printing plates having cellulose ester supports, grained zinc or aluminum lithographic plates, zincated lithographic printing plates, ungrained copper printing plates for preproofing copper chromium bimetallic plates, etc.

Numerous materials are suitable as supports or bases for the radiation sensitive plates prepared in accordance with the process described herein such as cellulose ester supports including the hydrophobic variety or the type having a surface made hydrophilic by a partial saponification, metals such as aluminum or zinc, terephthalic acid ester polymers, paper, glass or the like.

A further advantage of our photosensitive coatings and materials arises as a result of their stability so that they are not adversely affected on storage under conditions of excessive humidity and temperature. In this respect, the new materials are superior to the old bichromated glue or albumin layers of the prior art which must be prepared and sensitized just prior to usage because of their poor keeping qualities.

As pointed out immediately above and elsewhere in this description, our photosensitive materials have properties, i.e., speed or response to radiation and stabiilty, which make them extremely valuable in the field of photolithography and photography. However, our invention is not restricted to imagewise polymerization but may also readily be applied to bulk polymerization. Such a reaction is carried out by placing a mixture of the desired monomer ferric salt and per compound in a suitable reactor or container and irradiating the walls thereof with ultraviolet rays, visible light, X-rays, gamma rays or the like. In the event that ultraviolet or visible light is employed as the radiation, the walls of the reactor should, of course, be of glass or similar material transparent to this type of radiation. If, however, X-ray or gamma radiation is employed, the containing vessels may be of any material permeable thereto such as ceramic, steel, metal and the like.

An important advantage of using our process to effect bulk polymerization lies in the fact that elevated temperatures are unnecessary. Ordinarily, when such reactions are carried out in the presence of peroxide catalyst alone without the benefit of the ferric compound sensitizers or initiating catalysts as described herein, an external source of heat is required. Our method of bulk polymerization is eminently suitable wherein it is desired to effect polymerization in an intricately shaped vessel or container in order that the final polymer will be in the form of the reacting vessel. It is manifestly much easier to uniformly irradiate a reacting vessel than it is to evenly heat the same vessel, particularly if the container is of a large size or unusual configuration or shape.

As previously pointed out, it is a distinct advantage of the invention that the exciting or exposing radiation can be from a low intensity source such as an ordinary household incandescent lamp. Thus, the use of high energy radiation sources such as carbon flame arcs or mercury arcs, commonly employed to effect photopolymerization in the prior art processes, are dispensed with in our process. Furthermore, our photosensitive materials, in addition to eliminating the need for high intensity radiation sources, also possess high speed requiring only a few seconds exposure to effect imagewise polymerization and are thus equal to some of the lower speed silver halide photographic products. Such a characteristic suggests that the mechanism by which the process operates is of the free radical type. When the iron compounds in the form of ferric salts are exposed to light, they are transformed or reduced to the ferrous state which, in the presence of a peroxide or similar material, result in the formation of free radicals which, in turn, causes polymerization of unsaturated organic compounds or monomers. Furthermore, only a few photoproduced ferrous ions are required to initiate rapid and vigorous polymerization in the presence of per compounds since very low exposure times to relatively feeble radiation is sufficient. In other words, the photopolymerization of the instant invention makes use of an amplification factor, that is to say, slight photochemical changes can be used to trigger or modulate a much more vigorous secondary reaction, in this case, the polymerization of unsaturated organic compounds.

It is immaterial as to what order the iron compounds, monomer and source of free radicals are brought into contact. All three components can be mixed and exposed. For imagewise polymerization, however, it is desirable to combine the monomer and sensitive ferric compound followed by exposure and subsequent treatment with peroxides. The latter procedure has the advantage of yielding an extremely stable composition from which coatings can be manufactured having very long shelf life both before and after exposure. Since, in this ramification, the peroxide does not contact the iron sensitized monomer until after exposure, a highly reactive type of peroxide can be employed as the developer to bring about rapid polymerization. In other words, a latent image of irradiated or exposed ferric salts is used to trigger or effect rapid imagewise polymerization of an unsaturated organic compound.

Those skilled in the art, using the description and benefit of the present disclosure, can ascertain those combinations of monomer, iron compound and free radical source which will yield best results.

In the following examples are illustrated various ramification and aspects of our invention, although it is to be understood that the invention is not restricted thereto.

*Example I*

A composition was prepared from the following components:

| | Parts |
|---|---|
| Acrylamide | 180 |
| N,N'-methylene-bis-acrylamide | 7 |
| Water | 120 |

To 10 cc. of this composition, there was added 1 cc. of a 0.5% aqueous cumene hydroperoxide solution and 1 cc. of a 0.01 M ferric oxalate solution. The resulting mixture was then irradiated with a light emanating from a 375 watt tungsten lamp placed at a distance of 30 inches. In 65 seconds, a solid resinous mass had formed.

*Example II*

A composition was prepared having the following components:

| | Cc. |
|---|---|
| Gelatin (15% aqueous solution) | 15 |
| Monomer solution of Example I | 3 |
| Cumene hydroperoxide (0.5% aqueous solution) | 0.5 |
| Ferric ammonium citrate (0.01 M) | 5 |
| Sodium lauryl sulfate | 0.2 |

The above composition was coated on an aluminum plate after which it was allowed to dry and then exposed through a silver negative to a 375 watt tungsten lamp placed at a distance of 30 inches. After an exposure of 15 seconds, the plate was washed with water to remove unpolymerized monomer. A polymeric letter relief remained firmly attached to the aluminum plate.

Example III

The following composition was prepared:

| | |
|---|---|
| Gelatin (15% aqueous solution) cc__ | 15 |
| Monomer solution of Example I cc__ | 3 |
| Di-t-butylperoxide g__ | 0.06 |
| Ferric ammonium citrate (0.01 M) cc__ | 2.5 |
| Sodium lauryl sulfate cc__ | 0.2 |

The above composition was coated on an aluminum plate, dried and exposed through a silver negative to a 375 watt tungsten lamp placed at a distance of 30 inches. After an exposure period of 2 minutes, the unpolymerized monomer was washed off with water to give a polymerized letter relief.

Example IV

A composition was prepared having the following components:

| | |
|---|---|
| Gelatin (15% aqueous solution) cc__ | 20 |
| Acrylamide (180 parts) | |
| N,N'-methylene-bis-acrylamide (20 parts) cc__ | 3 |
| Water (120 parts) | |
| Ferric ammonium citrate (0.1 M) cc__ | 4 |
| Sodium lauryl sulfate drops__ | 2 |

This composition was coated on a paper base and after drying was exposed for 30 seconds through a silver negative using a 375 watt tungsten lamp placed at a distance of 12 inches. After exposure, the coating was dipped into a 1% by weight hydrogen peroxide or 15% by weight ammonium persulfate solution. After washing with water, a polymerized resist remained in the exposed areas.

Example V

A composition having the following components was prepared:

| | |
|---|---|
| Gelatin g__ | 4.5 |
| Monomer solution of Example I cc__ | 5 |
| Ferric ammonium citrate (0.1 M) cc__ | 5 |
| Water cc__ | 30 |
| Sorbitol g__ | 1 |
| Sodium lauryl sulfate cc__ | 0.2 |

The above mixture was coated on a cellulose triacetate film base after which it was allowed to thoroughly dry. The so obtained plate was then exposed through a silver negative for 15 seconds to a 375 watt tungsten lamp placed at a distance of 30 inches. The plate was then treated with a 1% solution of aqueous hydrogen peroxide for approximately 1 minute followed by washing with water. A polymerized letter relief was obtained which was firmly attached to the plastic film support.

Example VI

A composition was prepared having the following components:

| | |
|---|---|
| Gelatin g__ | 4.5 |
| Monomer solution of Example I cc__ | 5 |
| Potassium ferrioxalate (0.1 M) cc__ | 5 |
| Water cc__ | 30 |
| Sorbitol g__ | 1 |
| Sodium lauryl sulfate cc__ | 0.2 |

The above mixture was coated on triacetate film base, allowed to dry thoroughly and then exposed through a silver negative to a 375 watt tungsten lamp for 5 seconds at a distance of 30 inches. The exposed plate was then treated with a 1% by weight hydrogen peroxide solution followed by washing with water to remove the unpolymerized coating in the unexposed areas. There was obtained a polymerized letter relief firmly attached to the film base.

Example VII

A composition was prepared from the following components:

| | |
|---|---|
| Polyacrylamide (PAM 50) 7.5% aqueous solution cc__ | 30 |
| Monomer solution of Example I cc__ | 5 |
| Ferric ammonium citrate, green (0.1 M) cc__ | 5 |
| Sorbitol g__ | 2 |
| Glycerin cc__ | 1 |
| Sodium lauryl sulfate cc__ | 0.2 |

The aforesaid composition was coated on paper and allowed to thoroughly dry. The so obtained coating was then exposed through a silver negative to a tungsten light of 360 foot candles for 3 seconds at a distance of 70 centimeters. The resulting coating was then treated with a 1% aqueous solution of hydrogen peroxide followed by washing to remove the monomer in the unexposed areas. There was obtained a polymerized letter relief firmly attached to the paper support.

Example VIII

A composition having the following components was prepared:

A. 0.5 gram of an oil soluble blue dye such as Fat Blue B; C.I. Solvent Blue 19; Color Index, Second Edition, 1956, vol. 2, and 0.5 gram of tricresylphosphate was dispersed in a solution of 60 cc. of water and 10 g. of gelatin. Composition A was then mixed with the following:

| | |
|---|---|
| Ferric ammonium citrate (0.1 M) cc__ | 10 |
| Sorbitol g__ | 2 |
| Sodium lauryl sulfate cc__ | 0.5 |

A cellulose triacetate film base or paper base was given a coating of a hardened gelatin layer over which was coated the above composition. After thorough drying, the so obtained plate was exposed through a silver halftone separation negative to a 375 watt tungsten lamp for 30 seconds at a distance of 30 inches. After exposure, the plate was treated with a 1% hydrogen peroxide solution and then washed with water to remove the unpolymerized monomer in the unexposed areas. There was thus obtained a blue polymerized letter relief firmly attached to the support.

Example IX

The procedure was the same as given in Example VIII except that a continuous tone silver negative was used as a pattern.

Example X

The following composition was prepared:

| | |
|---|---|
| N-t-butylacrylamide g____ | 12 |
| Triallyl cyanurate g____ | 1.2 |
| Glycerin cc____ | 1 |
| Methanol cc____ | 30 |
| Ferric ammonium citrate, green (0.1 M in 1:3 water-methanol) cc____ | 5 |
| Sodium lauryl sulfate cc____ | 0.2 |

The above composition was coated on paper and allowed to thoroughly dry. The so obtained plate was then exposed through a silver negative to a 375 watt tungsten lamp for 1 minute at a distance of 30 inches. Coating was processed by steeping in 1% hydrogen peroxide in a 1:1 water-methanol solution. After washing away the monomer in the unexposed areas, a letter resist was obtained which was firmly attached to the paper base.

Various modifications of the invention will occur to persons skilled in the art. We, therefore, do not intend to be limited in the patent granted except as necessitated by the appended claims:

We claim:

1. A photographic element comprising a support having thereon a layer comprising a photographic hydrophilic colloid carrier material having dispersed therein, an ethylenically unsaturated monomer containing the terminal grouping $CH_2=CH<$ which is activated by a negative group, a light sensitive ferric ammonium salt of an organic acid and an organic per compound containing an O—O— grouping, said layer being capable of producing polymeric images when exposed to a pattern of actinic radiations and developed with water.

2. A process of producing a polymeric photographic image which comprises exposing to a pattern of actinic radiations, a photographic element comprising a support, carrying a layer comprising a photographic hydrophilic colloid carrier material having dispersed therein at least one ethylenically unsaturated monomer containing the terminal grouping $CH_2=C<$ which is activated by direct attachment to a negative group, and a light sensitive ferric salt of an aliphatic acid, to form imagewise quantities of activated iron salt in the exposed layer; contacting the exposed layer, with water and a per compound containing an O—O— grouping, to effect polymerization of the monomer in proportion to the amount of activated ferric salt; removing the residual monomer, thereby leaving a polymeric photographic image, the density of which corresponds to the intensity of the exposing radiation pattern.

3. A process of producing a polymeric photographic image which comprises exposing to visible light through a photographic negative a light sensitive photographic element carrying on a suitable support, a layer comprising a ferric salt of an aliphatic acid and a mixture of acrylamide, and N,N'-methylene-bis-acrylamide dispersed in a hydrophilic carrier material, treating the so exposed layer with an aqueous hydrogen peroxide solution to effect imagewise polymerization in the exposed areas to form therein a polymeric image and washing the layer with water to remove the unpolymerized material in the unexposed areas.

4. The process as defined in claim 2 wherein said ferric salt is a member of the group consisting of ferric ammonium oxalate and ferric ammonium citrate.

5. The process as defined in claim 2 wherein the ethylenically unsaturated monomer comprises N,N'-methylene-bis-acrylamide.

6. The product as defined in claim 1 wherein the ferric salt is a member of the group consisting of ferric ammonium oxalate and ferric ammonium citrate.

7. The process as defined in claim 2 wherein the colloid carrier is gelatin.

8. The process as defined in claim 2 wherein is added to the unsaturated polymerizable organic compound a cross-linking agent having at least two terminal vinyl groups.

9. The process as defined in claim 8 wherein the cross-linking agent is selected from the class consisting of N,N'-methylene-bis-acrylamide, triallyl cyanurate, divinyl benzene, divinyl ketones and diglycol diacrylate.

10. The process as defined in claim 2 wherein the radiation sensitive salt is irradiated with visible light.

11. The process as defined in claim 2 wherein the radiation sensitive salt is irradiated with ultraviolet light.

12. The process as defined in claim 2 wherein the per compound is an organic peroxide.

13. The process as defined in claim 2 wherein the per compound is selected from the class consisting of the ammonium and alkali metal salts of an inorganic per acid.

14. The product as defined in claim 1 wherein the photographic colloid carrier is gelatin.

15. The product as defined in claim 1 wherein the unsaturated polymerizable organic compound contains a cross-linking agent having at least two terminal vinyl groups.

16. The product as defined in claim 15 wherein the cross-linking agent is selected from the class consisting of N,N'-methylene-bis-acrylamide, triallyl cyanurate, divinyl benzene, divinyl ketones and diglycol diacrylate.

17. The product as defined in claim 1 wherein the ethylenically unsaturated monomer comprises a monomer which contains two terminal groups.

References Cited in the file of this patent

UNITED STATES PATENTS

| | | |
|---|---|---|
| 2,344,785 | Owens et al. | Mar. 21, 1944 |
| 2,760,863 | Plambeck | Aug. 28, 1956 |

FOREIGN PATENTS

| | | |
|---|---|---|
| 665,649 | Great Britain | Jan. 30, 1952 |

OTHER REFERENCES

Ellis et al.: Chemical Action of Ultraviolet Rays (1941), pp. 410 and 411.